United States Patent [19]

Belmont et al.

[11] Patent Number: 5,713,988
[45] Date of Patent: Feb. 3, 1998

[54] NON-AQUEOUS INKS AND COATINGS CONTAINING MODIFIED CARBON PRODUCTS

[75] Inventors: James A. Belmont, Acton; Curtis E. Adams, Watertown, both of Mass.

[73] Assignee: Cabot Corporation, Boston, Mass.

[21] Appl. No.: 572,336

[22] Filed: Dec. 14, 1995

Related U.S. Application Data

[63] Continuation-in-part of Ser. No. 356,462, Dec. 15, 1994, abandoned, and Ser. No. 356,653, Dec. 15, 1994, Pat. No. 5,554,739.

[51] Int. Cl.⁶ .................................................. C09D 11/02
[52] U.S. Cl. .................... 106/31.6; 106/31.75; 106/31.8; 106/476
[58] Field of Search ............................. 106/20 R, 23 R, 106/476, 31.6, 31.75, 31.8

[56] References Cited

U.S. PATENT DOCUMENTS

| | | | |
|---|---|---|---|
| T860,001 | 3/1969 | Gessler et al. | |
| 2,121,535 | 6/1938 | Amon | 106/423 |
| 2,156,591 | 5/1939 | Jacobson | 106/475 |
| 2,502,254 | 3/1950 | Glassman | 106/476 |
| 2,514,236 | 7/1950 | Glassman | 106/499 |
| 2,625,492 | 1/1953 | Young | 106/20 R |
| 2,793,100 | 5/1957 | Weihe | |
| 2,833,736 | 5/1958 | Glaser | 106/20 R |
| 2,867,540 | 1/1959 | Harris | |
| 3,011,902 | 12/1961 | Jordan | 106/477 |
| 3,025,259 | 3/1962 | Watson et al. | 260/41.5 |
| 3,043,708 | 7/1962 | Watson et al. | 106/476 |
| 3,335,020 | 8/1967 | Aboytes et al. | 106/476 |
| 3,479,300 | 11/1969 | Rivin et al. | 252/430 |
| 3,528,840 | 9/1970 | Aboytes | 106/476 |
| 3,607,813 | 9/1971 | Purcell | 106/20 R |
| 3,674,670 | 7/1972 | Erikson et al. | 428/411.1 |
| 3,686,111 | 8/1972 | Makhlouf et al. | 524/530 |
| 3,846,141 | 11/1974 | Ostergren et al. | 106/22 R |
| 3,876,603 | 4/1975 | Makhlouf | 106/472 |
| 4,003,751 | 1/1977 | Carder | 106/20 R |
| 4,006,031 | 2/1977 | Ferch et al. | 106/473 |
| 4,014,833 | 3/1977 | Story | 106/20 R |
| 4,014,844 | 3/1977 | Vidal et al. | 106/472 |
| 4,061,830 | 12/1977 | Greenberg | 428/469 |
| 4,176,361 | 11/1979 | Kawada et al. | 106/22 R |
| 4,204,871 | 5/1980 | Johnson et al. | 106/20 R |
| 4,204,876 | 5/1980 | Bowden | 106/474 |
| 4,290,072 | 9/1981 | Manusukhani | 206/20 R |
| 4,293,394 | 10/1981 | Darlington et al. | 205/524 |
| 4,308,061 | 12/1981 | Iwahashi et al. | 106/22 H |
| 4,328,041 | 5/1982 | Wilson | 106/472 |
| 4,442,256 | 4/1984 | Miller | 524/539 |
| 4,451,597 | 5/1984 | Victorius | 524/39 |
| 4,476,270 | 10/1984 | Brasen et al. | 524/364 |
| 4,478,905 | 10/1984 | Neely, Jr. | 428/324 |
| 4,503,174 | 3/1985 | Vasta | 523/39 |
| 4,503,175 | 3/1985 | Houze et al. | 524/39 |
| 4,525,521 | 6/1985 | Denhartog et al. | 524/517 |
| 4,525,570 | 6/1985 | Blum et al. | 528/75 |
| 4,530,961 | 7/1985 | Nguyen et al. | 106/20 R |
| 4,544,687 | 10/1985 | Schupp et al. | 523/414 |
| 4,555,535 | 11/1985 | Bendnarek et al. | 524/40 |
| 4,556,427 | 12/1985 | Lewis | 106/20 R |

(List continued on next page.)

FOREIGN PATENT DOCUMENTS

| | | |
|---|---|---|
| A 0006190 | 1/1980 | European Pat. Off. |
| 272127 | 6/1988 | European Pat. Off. |
| 433229 | 6/1991 | European Pat. Off. |
| 0 441 987 | 8/1991 | European Pat. Off. |
| 410152 | 2/1994 | European Pat. Off. |
| 636591 | 2/1995 | European Pat. Off. |
| 1164786 | 10/1958 | France |
| 1215895 | 4/1960 | France |
| 1224131 | 4/1960 | France |
| E 72775 | 4/1960 | France |
| 1331889A | 7/1963 | France |
| 2477593 | 11/1981 | France |
| 2564489 | 11/1985 | France |
| 2607528 | 6/1988 | France |
| 2426266A | 12/1975 | Germany |
| 3170748 | 7/1985 | Germany |
| 59/82467 | 5/1984 | Japan |
| 1/275666 | 11/1989 | Japan |
| 5/271365 | 10/1993 | Japan |
| 5339516 | 12/1993 | Japan |
| 6/025572 | 2/1994 | Japan |
| 6067421 | 3/1994 | Japan |
| 6073235 | 3/1994 | Japan |
| 862018 | 3/1961 | United Kingdom |
| 1191872 | 5/1970 | United Kingdom |
| WO 91/15425 | 10/1991 | WIPO |
| WO 92/13983 | 8/1992 | WIPO |

OTHER PUBLICATIONS

Derwent Publications Ltd., Database WPI Week 8002, AN 80–03330C; SU,A,659 523, Apr. 1979, Abstract.
Derwent Publications Ltd., Database WPI Week 9423, AN 94–189154; JP 61–28517A, May 1994, Abstract.
Derwent Publications Ltd., Database WPI Week 9524, AN 95–183086; JP,A,07 102 116, Apr. 1995, Abstract.
Patent Abstracts of Japan, vol. 95, No. 4, JP,A,07 102116, Apr. 1995, Abstract.
Derwent Publications Ltd., Database WPI Week 8651, AN 86–335147; JP 61–250 042, Nov. 1986, Abstract.

(List continued on next page.)

*Primary Examiner*—Helene Klemanski
*Attorney, Agent, or Firm*—James A. Cairns

[57] ABSTRACT

A non-aqueous coating or ink composition having incorporated therein a modified carbon product comprising carbon having attached a substituted or unsubstituted aromatic group is described. Also described is a modified carbon product comprising carbon and an attached organic group having a) an aromatic group and b) at least one group of the formula $SO_2NR_2$ or $SO_2NR(COR)$ wherein R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy)$_x$R' or a substituted or unsubstituted aryl; R' is hydrogen, a $C_1$–$C_{20}$ substituted or unsubstituted alkyl, a $C_3$–$C_{20}$ substituted or unsubstituted alkenyl, $C_1$–$C_{20}$ substituted or unsubstituted alkanoyl or substituted or unsubstituted aroyl; and x is from 1 to 40.

55 Claims, No Drawings

U.S. PATENT DOCUMENTS

| | | | |
|---|---|---|---|
| 4,597,794 | 7/1986 | Ohta et al. | 106/22 C |
| 4,605,596 | 8/1986 | Fry | 428/423.3 |
| 4,620,993 | 11/1986 | Suss et al. | 427/407.1 |
| 4,620,994 | 11/1986 | Suss et al. | 427/407.1 |
| 4,650,718 | 3/1987 | Simpson et al. | 428/413 |
| 4,659,770 | 4/1987 | Vasta | 524/553 |
| 4,665,128 | 5/1987 | Cluff et al. | 525/131 |
| 4,680,204 | 7/1987 | Das et al. | 427/407.1 |
| 4,681,811 | 7/1987 | Simpson et al. | 428/413 |
| 4,692,481 | 9/1987 | Kelly | 523/219 |
| 4,710,543 | 12/1987 | Chattha et al. | 525/161 |
| 4,713,427 | 12/1987 | Chattha et al. | 525/110 |
| 4,719,132 | 1/1988 | Porter, Jr. | 427/409 |
| 4,727,100 | 2/1988 | Vasta | 524/40 |
| 4,741,780 | 5/1988 | Atkinson | 106/300 |
| 4,752,532 | 6/1988 | Starka | 428/482 |
| 4,764,430 | 8/1988 | Blackburn et al. | 428/413 |
| 4,770,706 | 9/1988 | Pietsch | 106/24 R |
| 4,789,400 | 12/1988 | Sciodar et al. | 106/22 H |
| 4,798,745 | 1/1989 | Martz et al. | 427/407.1 |
| 4,798,746 | 1/1989 | Claar et al. | 427/407.1 |
| 4,808,656 | 2/1989 | Kania et al. | 524/512 |
| 4,820,751 | 4/1989 | Takeshita et al. | 523/215 |
| 4,840,674 | 6/1989 | Schwarz | 106/22 R |
| 4,853,037 | 8/1989 | Johnson et al. | 106/22 R |
| 4,883,838 | 11/1989 | Jung et al. | 525/119 |
| 4,908,397 | 3/1990 | Barsotti et al. | 523/400 |
| 4,914,148 | 4/1990 | Hille et al. | 524/507 |
| 4,927,868 | 5/1990 | Schimmel et al. | 523/439 |
| 4,975,474 | 12/1990 | Barsotti et al. | 523/400 |
| 4,994,520 | 2/1991 | Mori et al. | 106/20 R |
| 5,008,335 | 4/1991 | Pettit, Jr. | 525/111 |
| 5,017,435 | 5/1991 | Barsotti et al. | 428/502 |
| 5,026,755 | 6/1991 | Kveglis et al. | 524/389 |
| 5,051,464 | 9/1991 | Johnson | 524/555 |
| 5,064,719 | 11/1991 | Den Hartog et al. | 428/411.1 |
| 5,066,733 | 11/1991 | Martz et al. | 524/455 |
| 5,076,843 | 12/1991 | Acitelli et al. | 106/22 R |
| 5,093,391 | 3/1992 | Barsotti et al. | 523/400 |
| 5,093,407 | 3/1992 | Komai et al. | 524/495 |
| 5,100,470 | 3/1992 | Hindagolla et al. | 106/22 H |
| 5,106,417 | 4/1992 | Hauser et al. | 106/20 R |
| 5,109,055 | 4/1992 | Inui et al. | 524/400 |
| 5,114,477 | 5/1992 | Mort et al. | 106/22 H |
| 5,122,552 | 6/1992 | Johnson | 523/454 |
| 5,130,004 | 7/1992 | Johnson et al. | 204/181.7 |
| 5,130,363 | 7/1992 | Scholl et al. | 524/392 |
| 5,141,556 | 8/1992 | Matrick | 106/23 R |
| 5,152,801 | 10/1992 | Altermatt et al. | 106/473 |
| 5,159,009 | 10/1992 | Wolff et al. | 524/495 |
| 5,168,106 | 12/1992 | Babcock et al. | 524/495 |
| 5,173,111 | 12/1992 | Krishnan et al. | 106/20 R |
| 5,179,191 | 1/1993 | Jung et al. | 528/272 |
| 5,182,355 | 1/1993 | Martz et al. | 528/75 |
| 5,184,148 | 2/1993 | Suga et al. | 106/20 R |
| 5,190,582 | 3/1993 | Shinozuka et al. | 106/20 D |
| 5,200,164 | 4/1993 | Medalia et al. | 106/476 |
| 5,204,404 | 4/1993 | Werner, Jr. et al. | 524/501 |
| 5,206,295 | 4/1993 | Harper et al. | 525/207 |
| 5,221,581 | 6/1993 | Palmer et al. | 428/425.8 |
| 5,229,452 | 7/1993 | Green et al. | 524/514 |
| 5,232,974 | 8/1993 | Branan, Jr. et al. | 524/495 |
| 5,236,992 | 8/1993 | Bush | 524/495 |
| 5,242,751 | 9/1993 | Hartman | 428/324 |
| 5,266,361 | 11/1993 | Schwarte et al. | 427/407.1 |
| 5,266,406 | 11/1993 | Den Hartog et al. | 428/423.1 |
| 5,276,097 | 1/1994 | Hoffmann et al. | 525/167 |
| 5,281,261 | 1/1994 | Lin | 106/20 R |
| 5,286,286 | 2/1994 | Winnik et al. | 106/21 A |
| 5,288,788 | 2/1994 | Shieh et al. | 524/495 |
| 5,290,848 | 3/1994 | Palmer et al. | 524/517 |
| 5,302,197 | 4/1994 | Wickramanayke et al. | 106/20 R |
| 5,310,778 | 5/1994 | Shor et al. | 106/20 D |
| 5,314,945 | 5/1994 | Nickle et al. | 524/507 |
| 5,314,953 | 5/1994 | Corcoran et al. | 525/123 |
| 5,319,044 | 6/1994 | Jung et al. | 526/279 |
| 5,320,738 | 6/1994 | Kaufman | 205/317 |
| 5,324,790 | 6/1994 | Manring | 525/329.9 |
| 5,334,650 | 8/1994 | Serdiuk et al. | 524/591 |
| 5,336,716 | 8/1994 | Kappes et al. | 525/23 |
| 5,336,753 | 8/1994 | Jung et al. | 528/335 |
| 5,352,289 | 10/1994 | Weaver et al. | 106/476 |
| 5,356,973 | 10/1994 | Taljan et al. | 524/314 |
| 5,366,828 | 11/1994 | Struthers | 429/101 |
| 5,401,313 | 3/1995 | Supplee et al. | 106/476 |
| 5,554,739 | 9/1996 | Belmont | 534/885 |
| 5,571,311 | 11/1996 | Belmont et al. | 106/20 R |

OTHER PUBLICATIONS

PCT International Search Report, Application No. PCT/US 95/16195 Mailing Date: Apr. 19, 1996.

PCT International Search Report, Application No. PCT/US 95/16452, Mailing Date: Apr. 17, 1996.

PCT International Search Report, Application No. PCT/IB 95/01154, Mailing Date: Apr. 29, 1996.

PCT International Search Report, Application No. PCT/US 95/16281, Mailing Date: Apr. 26, 1996.

Derwent Abstract No. 82–28019E, Oct. 17, 1979, SU,A,834 062.

J. Am. Chem. Soc. 1992, 114, 5883–5884, no month available.

S. Wolff et al., "The Influence of Modified carbon Blacks on Viscoelastic Compound Properties" Kautschuk & Gummi, Kunststoffe 44, Jahrgang, Nr. 10/91, pp. 941–947.

C. Bourdillon, "Immobilization of glucose oxidase on a carbon surface derivatized by electrochemical reduction of diazonium salts" J. Electroanal. Chem., 336 (1992) 113–123, (no month available).

S.E. Moschopedis et al., "The Reaction of Diazonium Salts with Humic Acids and Coals: Evidence for Activated Methylene Bridges in Coals and Humic Acids" Fuel 43(4) at pp. 289–298 (1964), (no month available).

Ullmann's Encyclopedia of Industrial Chemistry, vol. A8, pp. 508–509, no date.

J.B. Donnet et al., "Chimie Superficielle Et Sites Privilégiés Des Charges Fines" Conference presentee aux Journees du Caoutchouc, Conference Internationale des Arts Chimiques, 22–23, pp. 5–12, (Jun. 1959).

V.A. Garten et al., "Nature Of Chemisorptive Mechanisms In Rubber Reinforcement", Commonwealth Scientific and Industrial Research Organ., Div. Of Industrial Chem., Melbourne, Australia, pp. 596–609, no date.

J.W. Watson, "Chemical Aspects Of Reinforcement", Compounding Research Dept., Dunlop Research Center, Dunlop Rubber Co., pp. 987–999, no date.

K. Ohkita, et al., "The Reaction Of Carbon Black Surface With 2,2–Diphenyl–1–picrylhydrazyl", CAR, vol. 10, No. 5, (Mar. 1972) pp. 631–636.

M.L. Studebaker et al., "Oxygen–Containing Groups On The Surface Of Carbon Black", Industrial and Eng. and Chem., vol. 48, No. 1, pp. 162–166, no date.

T. Yamaguchi et al., "Novel Carbon Black/Rubber Coupling Agent", Kautschuk and Gummi, Kunststoffe 42, Jahrgang Nr. 5/89, pp. 403–409.

J.B. Donnet et al., "Aroxylic Structure Of The Quinone Groups And Of The Free Radicals Present On Carbon Black Surfaces", Rev. Gen. Caoutchous Plasticques, vol. 42, No. 3, (1965), pp. 389–392. (w/Abstract), no month.

J.B. Donnet et al., "Radical Reactions And Surface Chemistry of Carbon Black", Bull. Soc. Chim. (1960) (Abstract only), no month available.

RAPRA Abstract 432845: Compounding Heat Resistant Non–Black EPDM Rubber, PPG Industries, Dec. 1990.

RAPRA Abstract 417612, D.C. Edwards, "Review: Polymer–Filler Interactions In Rubber Reinforcement", J. Mat. Sci., vol. 25, No. 10, Oct. 1990, pp. 4175–4185.

Gregory, Peter, "Ink Jet Printing", High–Technology Applications of Organic Colorants, Chapter 9, (1991), no month available.

RAPRA Abstract 403202, D. Siller, "Organotitanate, Zirconate Effect On Elastomers", Rubb. Plast. News, vol. 19, No. 24, pp. 14–27, Jun. 1990.

RAPRA Abstract 390600, H. Okamoto, "Application Of Coupling Agents To Elastomers", Nippon Gomu Kyokaishi, vol. 62, No. 12, (1989) pp. 819–833, no month.

RAPRA Abstract 394030, P. Flink et al., "Mechanical Properties Of Natural Rubber/Grafted Cellulose Fibre Composites", Brit. Polym. J., vol. 22, No. 2, 1990, pp. 147–153, no month available.

Tsubokawa et al., "Grafting Onto Carbon Black Having Few Functional Group" Shikizai Kyokaisha, vol. 66, No. 5, (1993) (Abstract Only), no month.

R.H. Leach et al., "The Printing Processes", The Printing Ink Manual, Chapter 2, Fourth Edition, 1988, no month available.

R.H. Leach et al., "Gravure Inks", The Printing Ink Manual, Chapters 8–10, Fifth Edition (1988), no month available.

N. Tsubokawa, "Functionalization Of Carbon Black By Surface Grafting Of Polymers", Dept. Of Material and Chemical Eng., pp. 417–470, 1992, no month.

"Ink Jet Printing: 1994 Overview and Outlook Supplied", Chapter 7, no date available.

Andreattola, Ink Jet Ink Technology. pp. 533–534, no date available.

Major, Michael J., "Formulating The Future of Automotive Coatings", Modern Paint and Coatings, pp. 34–36, (1992), no month available.

Greenfield, David, "Fewer Formulation Options Lead to Emphasis on Familiar", Modern Paint and Coatings, pp. 40–42, (1992), no month available.

Schrantz, Joe, "Automotive Coatings", Modern Paint and Coatings pp. 22–31, (1994), no month available.

"Regulations Focus Formulator Attention on Additives", Modern Paint and Coatings, pp. 32–36, (1994), no month available.

Sherrer, Robert, "Coloration Of Ink Jet Inks", BLS Ink Jet Printing Conference, Oct. 10–12, (1994), Monterey CA.

Allen, Ross, "Thermal Ink Jet Printing Trends and Advances", BLS Ink Jet Printing Conference, Oct. 10–12, (1994), Monterey, CA.

Schneider, John, "Continuous Ink Jet", BLS Ink Jet Printing Conference Oct. 10–12 (1994) Monterey, CA.

Abstract 388935, R. Mushack, "Light–Colored Fillers In Polymers", Gummi Fas. Kinst., vol. 42, No. 11, (1989), pp. 584–592, no month available.

Abstract 301034, J.Y. Germain et al., "Carbon Black Is Better With Silica" Rubb. World, vol. 193, No. 1, pp. 51–54, Oct. 1985.

Abstract 343229, "White And Black Fillers For Rubber Compounds", Ind.d. Gomma, vol. 30, No. 12, pp. 23–54, Dec. 1986.

Abstract 177481, L. Corbelli, "Ethylene–Propylene Rubbers", London Applied Science Publishers Ltd., (1981) Chapter 4, pp. 87–129, no month available.

Abstract 105623, G. Sugerman et al., "Putting Performance Into Thermosets With Titanium Coupling Agents", Cleveland, Ohio, pp. 106–113, Oct. 1976.

Abstract 056893, M.W. Ranney et al., "Applications For Silane Coupling Agents In The Automotive Industry", Kaut. U. Gummi Kunst., vol. 28, No. 10, pp. 597–608, Oct. 1975.

Abstract 002608, H.E. Haxo et al., "Ground Rice Hull Ash As A Filler For Rubber", Philadelphia, Paper No. 8, (1974), p. 41, Preprint .012, no month.

Abstract 000937, G.M. Cameron et al., "Reduction Of Hear Build–Up In Mineral–Filled Elastomers Through The Use Of Silane Coupling Agents", Gothenburg, (44) (1973) Ser. Sec. 012, no month available.

Abstract 86056110, "Putting Performance Into Thermosets With Titanium Coupling Agents", G. Sugerman et al., High Performance Plast. National Tech. Conference, Soc. Plast. Eng, 1976, no month available.

H. Zoheidi et al., "Role Of Oxygen Surface Groups In Catalysts Of Hydrogasification Of Carbon Black By Potassium Carbonate," Carbon vol. 25, No. 6, pp. 809–819, Mar. 1987.

J.D. Roberts et al., "Basic Principles Of Organic Chemistry," p. 1080, no date available.

NON-AQUEOUS INKS AND COATINGS CONTAINING MODIFIED CARBON PRODUCTS

This application is a continuation-in-part of U.S. patent application Ser. Nos. 08/356,462 now abandoned and 08/356,653, now U.S. Pat. No. 5,554,739, both filed Dec. 15, 1994, the disclosures of which are herein incorporated by reference.

BACKGROUND OF THE INVENTION

1. Field of the Invention

This invention relates to non-aqueous inks and coatings which contain a modified carbon product.

2. Discussion of the Related Art

Non-aqueous inks and coatings are used for many applications in which aqueous vehicles are not suitable. For instance, inks which are to be printed on hydrophobic, non-porous substrates such as metal, glass, or plastics must be fast-drying. Therefore, solvents such as ketones, esters, alcohols, or hydrocarbons are often used instead of water. Such solvent-based inks are used widely for industrial labeling of cardboard boxes and various metal or plastic containers and components. Specific examples include news ink compositions and web off-set gloss heat-set ink compositions.

Inks and coatings are also required to be water resistant in certain situations. Resins are therefore dissolved in non-aqueous solvents of ink and coating formulations to provide the desired water resistance upon drying. A primary use of such non-aqueous coatings is on metal and plastic automotive parts.

SUMMARY OF THE INVENTION

The present invention relates to a non-aqueous coating or ink composition having incorporated therein a modified carbon product comprising carbon having attached a substituted or unsubstituted aromatic group. Carbon, as used herein, is capable of reacting with a diazonium salt to form the above-mentioned modified carbon product. The carbon may be of the crystalline or amorphous type. Examples include, but are not limited to, graphite, carbon black, vitreous carbon, and activated charcoal or activated carbon. Finely divided forms of the above are preferred; also, it is possible to utilize mixtures of different carbons.

DESCRIPTION OF THE PREFERRED EMBODIMENTS

Carbon, as used herein, is capable of reacting with a diazonium salt to form the above-mentioned modified carbon product. The carbon may be of the crystalline or amorphous type. Examples include, but are not limited to, graphite, carbon black, vitreous carbon, activated charcoal, activated carbon, and mixtures thereof. Finely divided forms of the above are preferred; also, it is possible to utilize mixtures of different carbons. The modified carbon products may be prepared by reacting carbon with a diazonium salt in a liquid reaction medium to attach at least one organic group to the surface of the carbon. The diazonium salt may contain the organic group to be attached to the carbon. According to the invention, a diazonium salt is an organic compound having one or more diazonium groups. Preferred reaction media include water, any medium containing water, and any medium containing alcohol. Water is the most preferred medium. These modified carbon products, wherein the carbon is carbon black, and various methods for their preparation are described in U.S. patent application Ser. No. 08/356,660 entitled "Reaction of Carbon Black with Diazonium Salts, Resultant Carbon Black Products and Their Uses," filed Dec. 15, 1994 now abandoned and its continuation-in-part application, filed concurrently with this application, both of which are incorporated herein by reference. These modified carbon products, wherein the carbon is not carbon black, and various methods for their preparation are described in patent application Ser. No. 08/356,653 entitled "Reaction of Carbon Materials With Diazonium Salts and Resultant Carbon Products," filed Dec. 15, 1994, now U.S. Pat. No. 5,554,739, also incorporated herein by reference.

To prepare the above modified carbon products, the diazonium salt need only be sufficiently stable to allow reaction with the carbon. Thus, that reaction can be carried out with some diazonium salts otherwise considered to be unstable and subject to decomposition. Some decomposition processes may compete with the reaction between the carbon and the diazonium salt and may reduce the total number of organic groups attached to the carbon. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes. The diazonium salts of the present invention may be prepared in situ. It is preferred that the modified carbon products of the present invention contain no by-products or salts.

Carbon black can be reacted with a diazonium salt when present as a dilute, easily stirred, aqueous slurry, or in the presence of the proper amount of water for carbon black pellet formation. If desired, carbon black pellets may be formed utilizing a conventional pelletizing technology. Other carbons can be similarly reacted with the diazonium salt. In addition, when modified carbon products utilizing carbon other than carbon black for use in non-aqueous inks and coatings, the carbon should preferably be ground to a fine particle size before reaction with the diazonium salt to prevent unwanted precipitation in the inks and coatings.

The organic group may be an aliphatic group, a cyclic organic group, or an organic compound having an aliphatic portion and a cyclic portion. As discussed above, the diazonium salt employed in the reaction with the carbon can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, triazinyl, indolyl, and the like). As the steric hinderance of a substituted organic group increases, the number of organic groups attached to the carbon from the reaction between the diazonium salt and the carbon may be diminished.

When the organic group is substituted, it may contain any functional group compatible with the formation of a diazonium salt. Preferred functional groups include, but are not limited to, R, OR, COR, COOR, OCOR, halogen, CN, $NR_2$, $SO_2NR(COR)$, $SO_2NR_2$, NR(COR), $CONR_2$, $NO_2$, and N==NR'. R is independently hydrogen, $C_1$–$C_{20}$ substituted or unsubstituted alkyl (branched or unbranched), $C_3$–$C_{20}$ substituted or unsubstituted alkenyl, $(C_2$–$C_4$ alkyleneoxy)$_x$R", or a substituted or unsubstituted aryl. R' is independently hydrogen, $C_1$–$C_{20}$ substituted or unsubstituted alkyl (branched or unbranched), or a substituted or unsubstituted aryl. R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl, or a substituted or unsubstituted aroyl. The integer n ranges from 1–8 and preferably from 2–4. The integer x ranges from 1–40 and preferably from 2–25. The anion $X^-$ is a halide or an anion derived from a mineral or organic acid.

A preferred organic group is an aromatic group of the formula $A_yAr$—, which corresponds to a primary amine of the formula $A_yArNH_2$. In this formula, the variables have the following meanings: Ar is an aromatic radical selected from the group consisting of phenyl, naphthyl, anthracenyl, phenanthrenyl, biphenyl, pyridinyl, and triazinyl; A is a substituent on the aromatic radical independently selected from a preferred functional group described above or A is a linear, branched or cyclic hydrocarbon radical (preferably containing 1 to 20 carbons), unsubstituted or substituted with one or more of those functional groups; and y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl, or 1 to 2 when Ar is triazinyl. When A is a $(C_2$–$C_4$ alkyleneoxy)$_x$R" group, it is preferably a polyethoxylate group, a polypropoxylate group, or a random or block mixture of the two. Particularly preferred organic groups are those shown in the Examples below.

A preferred modified carbon product comprises carbon and an attached organic group having a) an aromatic group and b) at least one group of the formula $SO_2NR_2$ or $SO_2NR(COR)$. Preferably, R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy)$_x$R' or a substituted or unsubstituted aryl; R' is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl or substituted or unsubstituted aroyl; and x is from 1 to 40. Particularly preferred aromatic groups include $p$-$C_6H_4SO_2NH_2$, $p$-$C_6H_4SO_2NHC_6H_{13}$, $p$-$C_6H_4SO_2NHCOCH_3$, $p$-$C_6H_4SO_2NHCOC_5H_{11}$ and $p$-$C_6H_4SO_2NHCOC_6H_5$.

The modified carbon products above are useful in non-aqueous ink formulations. Thus, the invention provides an improved ink composition containing a solvent and a modified carbon product having attached a substituted or unsubstituted aromatic group. Other known ink additives may be incorporated into the ink formulation. It is also within the bounds of the present invention to use an ink formulation containing a mixture of unmodified carbon with the modified carbon products.

In general, an ink consists of four basic components: (1) a colorant or pigment, (2) a vehicle or varnish which functions as a carrier during printing, (3) additives to improve printability, drying, and the like, and (4) solvents to adjust viscosity, drying, and the compatibility of the other ink components. For a general discussion on the properties, preparation and uses of inks, see *The Printing Manual*, 5th Ed., R. H. Leach, et al, Eds. (Chapman & Hall, 1993).

The modified carbon products of the invention can be incorporated into an ink formulation using standard techniques either as a predispersion or as a solid. Use of the modified carbon products of the present invention may provide a significant advantage and cost savings by reducing the milling steps generally used with conventional carbonaceous materials such as carbon blacks. The modified carbon products of the present invention may also provide improved jetness.

As reflected in more detail below, the non-aqueous ink and coating formulations of the present invention may exhibit improved optical properties.

The modified carbon products above may also be used in non-aqueous coating compositions such as paints or finishes. Thus, an embodiment of the invention is an improved coating composition containing a solvent, a binder, and a modified carbon product having attached a substituted or unsubstituted aromatic group. Other conventional coating additives may be incorporated into the non-aqueous coating compositions.

Coating formulations vary widely depending on the conditions and requirements of final use. In general, coating systems contain up to 30% by weight carbon. The resin content can vary widely up to nearly 100%. Examples include acrylic, alkyd, urethane, epoxy, cellulosics, and the like. Solvent content may vary between 0 and 80%. Examples include aromatic hydrocarbons, aliphatic hydrocarbons, alcohols, polyalcohols, ketones, esters, and the like. Two other general classes of additives are fillers and modifiers. Examples of fillers are other coloring pigments, clays, talcs, silicas, and carbonates. Fillers can be added up to 60% depending on final use requirements. Examples of modifiers are flow and leveling aids and biocides generally added at less than 5%.

The modified carbon products of the invention can be incorporated into a non-aqueous coating composition using standard techniques either as a predispersion or as a solid. As with the non-aqueous ink compositions, use of a modified carbon product having attached a substituted or unsubstituted aromatic group may provide a significant advantage and cost savings by reducing the milling steps generally used with conventional carbonaceous materials. The modified carbon products of the present invention may also provide improved jetness.

The following examples are intended to illustrate, not limit, the claimed invention.

Unless otherwise specified, BET nitrogen surface areas obtained according to ASTM D-4820 are used for surface area measurements. CTAB area was obtained according to ASTM D-3765. DBPA data were obtained according to ASTM D-2414.

EXAMPLES

Example 1

Preparation of PEG 750 Methyl Ether Methanesulfonate

This example describes the preparation of PEG 750 methyl ether methanesulfonate used in Example 2. To a mixture of poly(ethylene glycol) methyl ether with average molecular weight of 750 (PEG 750 methyl ether) (30.4 g) and 20 mL methylene chloride under a nitrogen atmosphere was added pyridine (6.42 g). After all materials had dissolved, methanesulfonyl chloride (5.58 g) was added over about 3 minutes. The reaction was allowed to stir a minimum of 4 hours, but as many as 18–48 hours, to go to completion.

The reaction was worked up by diluting with 100 mL methylene chloride and washing with deionized water (D.I.

water), dilute HCl solution and sodium bicarbonate solution. The methylene chloride solution was dried over anhydrous sodium sulfate, filtered, then evaporated under reduced pressure to afford the product as an oil, 31.01 g (92.3% of theory). Analysis by $^1$H-NMR indicated a purity of 82%.

Example 2

Preparation of PEG 750 Methyl Ether Sulfanilamide

This example describes the preparation of PEG 750 methyl ether sulfanilamide used in Examples 11, 12, and 30. Sulfanilamide (3.74 g), 85% potassium hydroxide (1.2 g) and 30 mL acetonitrile were combined under a nitrogen atmosphere. The mixture was heated to 60°–70° C. and a small amount (<1 mL) of water was added. After stirring at 60°–70° C. for about one hour, a solution of PEG 750 methyl ether methanesulfonate (15 g) in 15 mL acetonitrile was added over 10 min. Stirring of this mixture at 60°–70° C. was continued for at least 14 hours.

The reaction was worked up by first removing the solvent under reduced pressure. This material was diluted with 75 mL methylene chloride and washed with D.I. water and saturated sodium chloride solution. The methylene chloride solution was dried over anhydrous sodium sulfate, filtered and vacuum concentrated to afford the product as an oil, 13.45 g (82% crude yield). Analysis by $^1$H-NMR indicated a purity of 80%.

Example 3

Preparation of PEG 350 Methyl Ether Methanesulfonate

This example describes the preparation of PEG 350 methyl ether methanesulfonate used in Example 4. This procedure is analogous to that of Example 1 except that an equimolar amount of polyethylene glycol methyl ether with average molecular weight of 350 (14.21 g) was substituted for the PEG 750 methyl ether. This procedure afforded 16.55 g product (95% crude yield). Analysis by $^1$H-NMR indicated a purity of about 85%.

Example 4

Preparation of PEG 350 Methyl Ether Sulfanilamide

This example illustrates the preparation of PEG 350 methyl ether sulfanilamide used in example 13. Sulfanilamide (2.41 g), 85% potassium hydroxide (0.78 g) and 20 mL acetonitrile were combined under a nitrogen atmosphere. The mixture was heated to 60°–70° C. and a small amount (<1 mL) of water was added. After stirring at 60°–70° C. for about one hour, a solution of PEG 350 methyl ether methanesulfonate (5 g) in 5 mL acetonitrile was added over 5 min. Stirring of this mixture at 60°–70° C. was continued for at least 4 hours.

The reaction was worked up by adjusting the pH of the mixture to about 5 with acetic acid and then removing the solvent under reduced pressure. This material was diluted with 75 mL methylene chloride and washed with D.I. water and saturated sodium chloride solution. The methylene chloride solution was dried over anhydrous sodium sulfate, filtered and vacuum concentrated to afford the product as a gel, 4.93 g (84% crude yield). Analysis by $^1$H-NMR indicated a purity of 68%.

Example 5

Polyoxyethylene(2) cetyl ether Methanesulfonate

This example describes the preparation of polyoxyethylene(2) cetyl ether methanesulfonate used in Example 6. To a mixture of polyoxyethylene(2) cetyl ether, 30.4 g and 10 mL methylene chloride under a nitrogen atmosphere was added pyridine (4.78 g). After all materials had dissolved, methanesulfonyl chloride (3.80 g) was added. After 3 hours the reaction mixture was diluted with 15 mL methylene chloride and stirring was continued 18 hours.

The reaction was worked up by diluting with 50 mL methylene chloride and washing with D.I. water, dilute HCl solution and dilute sodium hydroxide solution. The methylene chloride solution was dried over anhydrous sodium sulfate, filtered, then evaporated under reduced pressure to afford the product, 11.78 g (95% crude yield). Analysis by $^1$H-NMR indicated a purity of 90%.

Example 6

Preparation of $N^1$-(polyoxyethylene(2) cetyl ether) sulfanilamide

This example describes the preparation of $N^1$-(polyoxyethylene(2) cetyl ether) sulfanilamide used in Example 14. Sulfanilamide (2.0 g) and 85% potassium hydroxide (0.66 g) were combined under nitrogen and diluted with 15 mL acetonitrile. The mixture was heated to 60°–70° C. and then about 3 drops D.I. water and tetrabutylammonium hydroxide (1.18 mL of a 1.0M solution in methanol) were added. The mixture was stirred at 60°–70° C. for 22 hours.

The reaction was worked up by adding about 2 drops acetic acid and then removing the solvent under reduced pressure. The residue was diluted with 95 mL methylene chloride and washed with D.I. water and saturated sodium chloride solution. The methylene chloride phase was dried over anhydrous sodium sulfate, filtered, then evaporated under reduced pressure to afford the product, 4.19 g (88% crude yield). Analysis by $^1$H-NMR indicated a purity of 90%.

Example 7

Preparation of a Carbon Black Product

Sulfanilamide (5.0 g), 14.4 mL 6N HCl and 25 mL deionized water were combined and the mixture was heated, if necessary to dissolve the sulfanilamide. The solution was cooled in an ice water bath. A carbon black with a surface area of 58 m$^2$/g and DBPA of 46 mL/100 g (100 g) was suspended in 400 mL D.I. water and the stirred slurry was cooled in an ice water bath. Sodium nitrite (2.2 g) was dissolved in about 20 mL D.I. water and this solution was added over several minutes to the sulfanilamide solution.

After 10–20 minutes at 0°–5° C. the diazonium solution was added to the slurry of carbon black in water. Gas evolution was evident within about 5 minutes. The slurry was removed from the ice bath and stirring was continued until no further gas evolution was observed. The product may be isolated by evaporation of the water either at reduced pressure at about 110° C. or in a laboratory oven at about 125° C. Alternatively the product may be isolated by vacuum filtration and washing with water to remove by-product salts. The product has attached p-$C_6H_4SO_2NH_2$ groups.

Example 8

Preparation of a Carbon Black Product

The procedure of Example 7 was used substituting an equimolar amount of acetylsulfanilamide sodium salt for the sulfanilamide in the previous procedure. This produced a product having attached p-$C_6H_4SO_2NHCOCH_3$ groups.

Example 9

Preparation of a Carbon Black Product

The treatment was done under neutral to basic conditions by repeating the procedure of Example 7 and adding, to the mixture of carbon black and water, a slight excess of concentrated ammonium hydroxide over the amount of HCl employed in the diazonium formation step, approximately 5% excess. (Carbon black treated in this way is somewhat more dispersible in water and should be first slurried in dilute HCl solution prior to isolation by filtration.) The product had attached p-$C_6H_4SO_2NH_2$ groups.

Example 10

Preparation of a Carbon Black Product

The treatment was done under neutral to basic conditions by repeating the procedure of Example 8 and adding, to the mixture of carbon black and water, a slight excess of concentrated ammonium hydroxide over the amount of HCl employed in the diazonium formation step, approximately 5% excess. (Carbon black treated in this way is somewhat more dispersible in water and should be first slurried in dilute HCl solution prior to isolation by filtration.) This produced a product that had attached p-$C_6H_4SO_2NHCOCH_3$ groups.

Example 11

Preparation of a Carbon Black Product

This treatment procedure was similar to that of Example 7. To a solution of 13.1 g PEG 750 methyl ether sulfanilamide, from Example 2, in 100 mL D.I. water was added 3.6 mL concentrated HCl and a 50 mL D.I. water rinse. The solution was cooled in an ice water bath. A suspension of 25 g of a carbon black with a surface area of 58 $m^2$/g and DBPA of 46 mL/100 g in 100 mL was cooled in an ice water bath.

To the PEG 750 methyl ether sulfanilamide solution was added a solution of 1.00 g sodium nitrite in 10 mL D.I. water to form the diazonium salt. A total of 0.14 g sulfamic acid (0.1 equivalent) was added to reduce the excess of nitrous acid. This solution was split into two equal parts. One part was added to the aqueous slurry of carbon black in water. Gas was evolved from the slurry and stirring was continued until no further gas evolution was observed. In this case the dry carbon black product was recovered by evaporation in a vacuum oven at 110° C. to afford 30.1 g (approximately 98% of expected weight). This produced a product that had attached p-$C_6H_4SO_2NH(C_2H_4O)_{16}CH_3$ groups.

Example 12

Preparation of a Carbon Black Product

This procedure was analogous to that of Example 11 where the treatment level was reduced. In this case the diazonium formed from 1.0 g PEG 750 sulfanilamide (Example 2), 0.27 mL concentrated HCl and 0.08 g $NaNO_2$ was used to treat 10 g of carbon black. This produced a product that had attached p-$C_6H_4SO_2NH(C_2H_4O)_{16}CH_3$ groups.

Example 13

Preparation of a Carbon Black Product

This treatment was analogous to that of Example 11 performed on one half the scale, utilizing the diazonium prepared from 3.66 g PEG 350 sulfanilamide from Example 4, 1.82 mL concentrated HCl and 0.50 g $NaNO_2$. One half of this solution was used to treat 12.5 g carbon black. This produced a product that had attached p-$C_6H_4SO_2NH(C_2H_4O)_7CH_3$ groups.

Example 14

Preparation of a Carbon Black Product

This treatment was identical to Example 13, substituting 3.52 g $N^1$-(polyoxyethylene(2) cetyl ether) sulfanilamide from Example 6 in place of the PEG 350 sulfanilamide. This produced a product that had attached p-$C_6H_4SO_2NH(C_2H_4O)_2C_{16}H_{33}$ groups.

Example 15

Preparation of a carbon black product

A carbon black with a surface area of 58 $m^2$/g and a DBPA of 46 ml/100 g was used. A suspension of 50 g of this carbon black was prepared by stirring it into 450 g of water. A solution of 0.85 g of $NaNO_2$ in 4 g of cold water was slowly added to a solution of 0.94 g of aniline and 1.98 g of concentrated nitric acid in 5 g of water that was cooled in an ice bath. Benzenediazonium nitrate was formed. After 15 minutes of stirring, the mixture was added to the stirring carbon black suspension. Bubbles were released. When the bubbling had stopped, the product was collected by filtration, washed twice with water and dried in an oven at 125° C. The carbon black product had attached phenyl groups.

Example 16

Preparation of a carbon black product

A carbon black with a surface area of 58 $m^2$/g and a DBPA of 46 ml/100 g was used. A suspension of 50 g of this carbon black was prepared by stirring it into 450 g of water. A solution of 5.12 g of $NaNO_2$ in 15 g of cold water was slowly added to a solution of 1.40 g of p-phenetidine and 1.98 g of concentrated nitric acid in 5 g of water that was cooled in an ice bath. 4-Ethoxybenzenediazonium nitrate was formed. After 15 minutes of stirring, the mixture was added to the stirring carbon black suspension. Bubbles were released. After 30 minutes, the product was collected by filtration, washed twice with water and dried in an oven at 125° C. The carbon black product had attached p-$C_6H_4OC_2H_5$ groups.

Example 17

Preparation of a carbon black product

A carbon black with a surface area of 58 $m^2$/g and a DBPA of 46 ml/100 g was used. A suspension of 50 g of this carbon black was prepared by stirring it into 450 g of water. A solution of 0.85 g of $NaNO_2$ in 4 g of cold water was slowly added to a dispersion of 2.98 g of 4-tetradecylaniline, 1.98 g of concentrated nitric acid and 4 ml of acetone in 15 g of water that was cooled in an ice bath. 4-Tetradecylbenzenediazonium nitrate was formed. After 15 minutes of stirring, the mixture was added to the stirring carbon black suspension. Bubbles were released. After 30 minutes, the product was collected by filtration, washed with water and tetrahydrofuran (THF) and dried in an oven at 125° C. The carbon black product had attached p-$C_6H_4C_{14}H_{29}$ groups.

Example 18

Preparation of polyoxyethylene(4) lauryl ether sulfanilamide

This example describes the preparation of polyoxyethylene(4) lauryl ether sulfanilamide used in Examples 20 and 21. To a mixture of polyoxyethylene(4) lauryl ether (10 g) and 10 mL methylene chloride under a nitrogen atmosphere was added pyridine (4.37 g). After all materials had dissolved, methanesulfonyl chloride (3.48 g) was added and the temperature maintained below 40° C. After about 1 hour, the reaction mixture was diluted with 10 mL methylene chloride and stirring was continued 21 hours.

The reaction was worked up by diluting with 50 mL methylene chloride and washing with D.I. water, dilute HCl solution and dilute sodium hydroxide solution. The methylene chloride solution was dried over anhydrous sodium sulfate, filtered, then evaporated under reduced pressure to afford the product, 10.49 g (86% crude yield). Analysis by $^1$H-NMR indicated a purity of 83%. This product, polyoxyethylene(4) lauryl ether methanesulfonate, was used in the following procedure.

Sulfanilamide (1.88 g) and 85% potassium hydroxide (0.61 g) were combined under nitrogen and diluted with 15 mL acetonitrile. The mixture was heated to 60°–70° C. and then about 3 drops D.I. water and tetrabutylammonium hydroxide (1.1 mL of a 1.0M solution in methanol) were added. Polyoxyethylene(4) lauryl ether methanesulfonate (4.0 g) dissolved in 5 mL acetonitrile was added. The mixture was stirred at 60°–70° C. for 22 hours. Additional acetonitrile (20 mL) was added after 3 hours.

The reaction was worked up by adding about 6 drops acetic acid and then removing the solvent under reduced pressure. The residue was diluted with 75 mL methylene chloride and washed with D.I. water and saturated sodium chloride solution. The methylene chloride phase was dried over anhydrous sodium sulfate, filtered, then evaporated under reduced pressure to afford the product, 4.27 g (91% crude yield). Analysis by $^1$H-NMR indicated a purity of 88%.

Example 19

Preparation of $N^1$-hexyl sulfanilamide

This example describes the preparation of $N^1$-hexyl sulfanilamide used in Examples 22 and 23. Sulfanilamide (10.0 g) and 85% potassium hydroxide (2.79 g) were combined under nitrogen and diluted with 100 mL acetonitrile. The mixture was heated to 60°–70° C. and then tetrabutylammonium hydroxide (5.6 mL of a 1.0M solution in methanol) was added. n-Hexyl bromide (9.12 g) was added to the reaction mixture followed by a 20 mL acetonitrile rinse. The mixture was stirred at 60°–70° C. for 23 hours.

The reaction was worked up by removing the solvent under reduced pressure and then diluting with 100 mL ethyl acetate. This solution was washed with D.I. water, saturated sodium bicarbonate, and saturated sodium chloride solution. The ethyl acetate phase was dried over anhydrous sodium sulfate, filtered, then evaporated under reduced pressure to afford the product, 12.93 g (87% crude yield). This material was recrystallized from 50% aqueous ethanol to afford 9.90 g product (69.8% yield).

Example 20

Preparation of a Carbon Black Product

Polyoxyethylene(4) lauryl ether sulfanilamide from Example 18 (3.38 g), 1.63 mL concentrated HCl, 10 mL acetone, and 50 mL deionized water were combined. The solution was cooled in an ice water bath. A carbon black with a surface area of 58 m$^2$/g and DBPA of 46 mL/100 g (11.25 g) was suspended in 50 mL D.I. water and the stirred slurry was cooled in an ice water bath. Sodium nitrite (0.50 g) was dissolved in about 20 mL D.I. water and this solution was added over several minutes to the sulfanilamide solution.

After 10–20 minutes at 0°–10° C. the diazonium solution was split into two equal portions. One portion was added to the slurry of carbon black in water. Gas evolution was evident within about 5 minutes. The slurry was removed from the ice bath and stirring was continued until no further gas evolution was observed. The product was isolated by evaporation of the water at reduced pressure at about 110° C. The product had attached p-$C_6H_4SO_2NH(C_2H_4O)_4C_{12}H_{25}$ groups.

Example 21

Preparation of a Carbon Black Product in the presence of ammonium hydroxide

A carbon black with a surface area of 58 m$^2$/g and DBPA of 46 mL/100 g (11.25 g) was suspended in a mixture of 0.68 mL concentrated ammonium hydroxide and 50 mL D.I. water and the stirred slurry was cooled in an ice water bath. The remaining portion of the diazonium solution from Example 20 was added to the slurry of carbon black in water. Gas evolution was evident within about 5 minutes. The slurry was removed from the ice bath and stirring was continued until no further gas evolution was observed. The product was isolated by evaporation of the water at reduced pressure at about 110° C. The product had attached p-$C_6H_4SO_2NH(C_2H_4O)_4C_{12}H_{25}$ groups.

Example 22

Preparation of a Carbon Black Product $N^1$-Hexyl sulfanilamide from Example 19 (7.43 g), 7.2 mL concentrated HCl, 20 mL acetone, and 100 mL deionized water were combined. The solution was cooled in an ice water bath. A carbon black with a surface area of 58 m$^2$/g and DBPA of 46 mL/100 g (50 g) was suspended in 200 mL D.I. water and the stirred slurry was cooled in an ice water bath. Sodium nitrite (2.20 g) was dissolved in about 20 mL D.I. water and this solution was added over several minutes to the sulfanilamide solution.

After 10–20 minutes at 0°–10° C. the diazonium solution was treated with 0.28 g sulfamic acid and split into two equal portions. One portion was added to the slurry of carbon black in water. Gas evolution was evident within about 5 minutes. The slurry was removed from the ice bath and stirring was continued until no further gas evolution was observed. The product was isolated by filtration and washing with several portions of D.I. water. The damp solid was dried at reduced pressure at about 110° C. The product had attached p-$C_6H_4SO_2NHC_6H_{13}$ groups.

Example 23

Preparation of a Carbon Black Product in the presence of ammonium hydroxide

A carbon black with a surface area of 58 m$^2$/g and DBPA of 46 mL/100 g (50 g) was suspended in a mixture of 3.0 mL concentrated ammonium hydroxide and 200 mL D.I. water and the stirred slurry was cooled in an ice water bath. The remaining portion of the diazonium solution from Example 22 was added to the slurry of carbon black in water. Gas evolution was evident within about 5 minutes. The slurry was removed from the ice bath and stirring was continued until no further gas evolution was observed. The product was isolated by filtration and washing with several portions of D.I. water. The damp solid was dried at reduced pressure at about 110° C. The product had attached p-$C_6H_4SO_2NHC_6H_{13}$ groups.

Example 24

Evaluation of Carbon Black Products in Gloss Ink Systems

The carbon black products of Examples 7-14 were evaluated in a standard heat set gloss ink formulation prepared on a three-roll mill.

The carbon black samples were prepared for grind on a three roll mill by hand mixing 15 g of carbon black with 35 g grind masterbatch consisting of 9 parts LV-3427XL (heatset grinding vehicle, Lawter International, Northbrook, Ill.) to 1 part MAGIESOL 47 oil until all of the sample was evenly wetted. This mixture was ground on a Kent three roll mill running at 70° F. Samples were let down by mixing with an equal amount of the grind masterbatch and then applied to a NIPRI production grindometer G-2 for evaluation of grind. The standards were typically passed four times through the mill. Additional passes were made if the grind gauge reading was above 20. The finished ink was produced by mixing the milled material with an equal weight of grind masterbatch.

MAGIESOL is a registered trademark for oils available from Magie Brothers, Franklin Park, Ill.

Optical properties were determined on a 3 mil drawdown that had been dried at 285° F. for 3 min. A Hunter Color Meter was used to measure L*, a* and b* data. Optical density was measured with a MacBeth RD918 densitometer. Gloss was measured with a BYK Gardner model 4527 glossmeter.

Fineness of grind data for carbon black products from Examples 7-14 and optical properties of the resulting inks are shown below. The numbers in the grind data table are in microns as measured on a G-2 grind gauge and indicate the level where 3 defect grains are detected on the grind gauge.

These data show that all of the carbon black products described in Examples 7-14 can be used to produce inks. Most carbon black products of the Examples give a jetter ink (lower L*), and some of these carbon black products disperse in the grind vehicle more rapidly than the standard carbon black. The improved dispersion rate and color quality are highly desirable qualities for the printing industry.

| Grind Data | | | | | | |
|---|---|---|---|---|---|---|
| Carbon Type\Number of Mill Passes | 1 | 2 | 3 | 4 | 5 | 6 |
| Standard Untreated | 50 | 40 | 31 | 11 | a | a |
| Example 7 | 50 | 48 | 30 | 10 | a | a |
| Example 8 | 50 | 46 | 26 | 8 | a | a |
| Example 9 | 50 | 30 | 25 | 5 | a | a |
| Example 10 | 50 | 50 | 12 | 0 | a | a |
| Example 11 | 50 | 50 | 13 | 0 | a | a |
| Example 12 | 50 | 50 | 23 | 6 | a | a |
| Example 13 | 50 | 50 | 40 | 42 | 42 | 15 |
| Example 14 | 50 | 37 | 25 | 9 | a | a | aMilling terminated after 4 passes

| | Optical Properties | | | | |
|---|---|---|---|---|---|
| Carbon from Example #: | Optical Density | Gloss (60°) | Hunter Color Meter | | |
| | | | L* | a* | b* |
| Standard Untreated | 1.94 | 115 | 5.70 | −0.46 | −2.28 |
| 7 | 2.22 | 109 | 3.18 | −0.30 | −1.40 |
| 8 | 2.12 | 108 | 3.82 | −0.28 | −1.36 |
| 9 | 2.35 | 90 | 2.39 | −0.23 | −1.19 |
| 10 | 2.07 | 110 | 4.45 | −0.39 | −1.62 |
| 11 | 2.25 | 114 | 3.05 | −0.26 | −0.96 |
| 12 | 1.99 | 113 | 5.15 | −0.40 | −2.13 |
| 13 | 2.26 | 113 | 3.13 | −0.23 | −1.10 |
| 14 | 2.18 | 100 | 3.58 | −0.12 | −0.30 |

Example 25

Evaluation of Carbon Black Products in Gloss Ink Systems

The carbon black products of Examples 15-17 were evaluated in the same gloss ink formula as in Example 24 using the same procedures. The data in the tables show that the carbon black products of Examples 15-17 can also be used to produce inks.

| Grind Data | | | | | | |
|---|---|---|---|---|---|---|
| Example\Number of Mill Passes | 1 | 2 | 3 | 4 | 5 | 6 |
| Standard Untreated | 50+ | 25 | 20 | 11 | --- | --- |
| 15 | 50+ | 36 | 31 | 20 | 20 | 18 |
| 16 | 50+ | 34 | 30 | 18 | 21 | 21 |
| 17 | 50+ | 42 | 20 | 18 | 18 | 18 |

| | Optical Properties | | | | |
|---|---|---|---|---|---|
| Carbon from Example #: | Optical Density | Gloss (60°) | Hunter Color Meter | | |
| | | | L* | a* | b* |
| Standard Untreated, 2nd trial | 2.23 | 108 | 5.41 | −0.34 | −1.52 |
| 15 | 2.47 | 112 | 3.07 | −0.25 | −0.62 |
| 16 | 2.45 | 107 | 3.16 | −0.18 | −0.59 |
| 17 | 2.40 | 95 | 3.86 | −0.42 | −0.85 |

Example 26

Three Roll Mill grind results for examples 20-23

The carbon black products of Examples 20-23 were evaluated in the same gloss ink formula as in Example 24 using the same procedures. The data in the tables show that the carbon black products of Examples 20-23 can also be used to produce inks.

| Grind Data | | | | | | |
|---|---|---|---|---|---|---|
| Example\Number of Mill Passes | 1 | 2 | 3 | 4 | 5 | 6 |
| 20 | 50+ | 34 | 23 | 20 | 20 | 19 |
| 21 | 50+ | 34 | 30 | 16 | 18 | 18 |
| 22 | 50+ | 38 | 20 | 0 | —[a] | —[a] |
| 23 | 50+ | 34 | 28 | 22 | 11 | 8 |

[a]Grinding stopped at four mill passes.

| | Optical Properties | | | | |
|---|---|---|---|---|---|
| Treated Carbon from | Optical | Gloss | | Hunter Color Meter | |
| Example #: | Density | (60°) | L* | a* | b* |
| 20 | 2.31 | 100 | 4.14 | −0.02 | 0.26 |
| 21 | 2.34 | 100 | 4.17 | −0.07 | 0.17 |
| 22 | 2.39 | 108 | 3.23 | −0.38 | −0.90 |
| 23 | 2.41 | 115 | 3.25 | −0.35 | −1.05 |

Example 27

Preparation of a carbon black product

Acetylsulfanilamide sodium salt monohydrate (44.2 g), and 43.5 mL concentrated HCl were combined in 300 mL deionized water. The mixture was heated if necessary to dissolve the acetylsulfanilamide then cooled in an ice water bath. In a separate beaker 50 g of a carbon black with a CTAB surface area of 350 m$^2$/g and DBPA of 120 mL/100 g was suspended in 400 mL D.I. water and the stirred slurry was cooled in an ice water bath. Sodium nitrite, 6.6 g, was dissolved in about 20 mL D.I. water and this solution was added to the acetylsulfanilamide solution.

After 10–20 minutes at 0°–5° C. the one half of the diazonium solution was added to the slurry of carbon black in water. Gas evolution was evident within about 5 minutes. The slurry was removed from the ice bath and stirring was continued until no further gas evolution was observed. The product may be isolated by evaporation of the water either at reduced pressure at about 110° C. or in a laboratory oven at about 125° C. Alternatively the product may be isolated by vacuum filtration and washing with water to remove by-product salts. Oven dried blacks may be purified by Soxhlet extraction using 90% ethanol in water. This produced a product that had attached p-$C_6H_4SO_2NHCOCH_3$ groups.

Example 28

Preparation of a carbon black product

This preparation was identical to that of Example 27 except that it was done under neutral to basic conditions by adding, to the mixture of carbon black and water, a slight excess of concentrated ammonium hydroxide over the amount of HCl employed in the diazonium formation step, approximately 5% excess. (Carbon black treated in this way is somewhat more dispersible in water and should be first slurried in dilute HCl solution prior to isolation by filtration.) This produced a product that had attached p-$C_6H_4SO_2NHCOCH_3$ groups.

Example 29

Preparation of a carbon black product

This procedure was identical to that of Example 28, except that an equimolar amount of sulfanilamide was substituted for the acetylsulfanilamide sodium salt in that example. This produced a product that had attached p-$C_6H_4SO_2NH_2$ groups.

Example 30

Preparation of a carbon black product

This treatment procedure was similar to that of Example 28. To a solution of 221 g PEG 750 methyl ether sulfanilamide (from Example 2) of 62% purity by weight in 2.1 L D.I. water was added 61 mL concentrated HCl and a 100 mL D.I. water rinse. The solution was cooled in an ice water bath. To this solution was added a solution of 8.0 g (0.95 equivalents) sodium nitrite in 30 mL D.I. water to form the diazonium salt. A total of 2.2 g sulfamic acid (0.1 equivalent) was added to reduce the excess of nitrous acid.

A carbon black with a CTAB surface area of 350 m$^2$/g and DBPA of 120 mL/100 g (50 g) was suspended in a mixture of 450 mL D.I. water and 25.5 mL concentrated ammonium hydroxide and then was cooled in an ice water bath. One half of the diazonium solution was added to the carbon black slurry. Gas was evolved from the reaction and stirring was continued until no further gas evolution was observed. In this case the dry black was recovered by evaporation in a vacuum oven at 125° C. followed by Soxhlet extraction with 90% ethanol in water. This produced a product that had attached p-$C_6H_4SO_2NH(C_2H_4O)_{16}CH_3$ groups.

Example 31

Preparation of a carbon black product

A carbon black with a CTAB surface area of 350 m$^2$/g and a DBPA of 120 ml/100 g was used. A suspension of 50 g of this carbon black was prepared by stirring it into 450 g of water that contained a few drops of isopropanol. A solution of 5.12 g of NaNO$_2$ in 10 g of cold water was slowly added to a solution of 5.62 g of aniline and 11.88 g of concentrated nitric acid in 10 g of water that was cooled in an ice bath. Benzenediazonium nitrate was formed. After 15 minutes of stirring, the mixture was added to the stirring carbon black suspension. Bubbles were released. When the bubbling had stopped, the product was collected by filtration, washed twice with water and dried in an oven at 125° C. The carbon black product had attached phenyl groups.

Example 32

Preparation of a carbon black product

A carbon black with a CTAB surface area of 350 m$^2$/g and a DBPA of 120 ml/100 g was used. A suspension of 50 g of this carbon black was prepared by stirring it into 450 g of water that contained a few drops of isopropanol. A solution of 5.12 g of NaNO$_2$ in 15 g of cold water was slowly added to a solution of 8.40 g of p-phenetidine and 11.88 g of concentrated nitric acid in 10 g of water that was cooled in an ice bath. 4-Ethoxybenzenediazonium nitrate was formed. After 15 minutes of stirring, the mixture was added to the stirring carbon black suspension. Bubbles were released. After 30 minutes, the product was collected by filtration, washed twice with water and dried in an oven at 125° C. The carbon black product had attached p-$C_6H_4OC_2H_5$ groups.

Example 33

Preparation of a carbon black product

A carbon black with a CTAB surface area of 350 m$^2$/g and a DBPA of 120 ml/100 g was used. A suspension of 50 g of this carbon black was prepared by stirring it into 450 g of water that contained a few drops of isopropanol. A solution of 5.12 g of $NaNO_2$ in 10 g of cold water was slowly added to a dispersion of 17.91 g of 4-tetradecylaniline, 11.88 g of concentrated nitric acid and 20 mL of acetone in 100 g of water that was cooled in an ice bath. 4-Tetradecylbenzenediazonium nitrate was formed. After 15 minutes of stirring, the mixture was added to the stirring carbon black suspension. Bubbles were released. After 30 minutes, the product was collected by filtration, washed with water and tetrahydrofuran (THF) and dried in an oven at 125° C. The carbon black product had attached p-$C_6H_4C_{14}H_{29}$ groups.

Example 34

Use of carbon black products in coatings compositions

This example illustrates the use of carbon black products in thermoset acrylic compositions. A surface treated carbon black with a surface area of 560 m²/g and a DBPA of 100 mL/100 g, and a carbon black with a CTAB surface area of 350 m²/g and a DBPA of 120 mL/100 g were used as reference carbon blacks.

The coating compositions were prepared as follows. To each one half gallon steel ball mill were charged: 2.1 kg ¼" steel balls, 3.3 kg ½" steel balls, 282 g grind masterbatch (64 parts ACRYLOID AT 400 resin: 30 parts n-butanol: 6 parts methyl-n-amyl ketone), and 30 g carbon black. The mill jars were turned at 44 rpm on a jar rolling mill operating at 82 rpm (Paul O. Abbe model 96806 or equivalent) for the time indicated. The mills were sampled directly on a Hegman grind gauge at the indicated times. Grind gauge values over 7 are generally accepted as a complete grind. Data are shown below.

The finished coating formulation was prepared by first reducing each mill with 249 g AT-400 resin and turning for one hour. A second reduction is done adding 304 g of a mixture of 33 parts AT-400 resin; 35.3 parts CYMEL 303 melamine-formaldehyde resin 7.2 parts methyl-n-amyl ketone; 8.5 parts cellosolve acetate; 1.8 parts CYCAT 4040 (an acid catalyst of toluenesulfonic acid and isopropylene); 0.3 parts FLUORAD FC 431 additive; 14 parts n-butanol; and rolling for one hour.

ACRYLOID is a registered trademark for resins available from Rohm & Haas, Philadelphia, Pa. CYMEL and CYCAT are registered trademarks for products available from American Cyanamid, Stamford, Conn. FLUORAD is a registered trademark for a coating additive available from 3M, St. Paul, Minn.

The optical properties were determined on a 3 mil film on a sealed Leneta chart that had been air dried for 30 min and then baked at 250° F. for 30 minutes. Grind data correspond to Hegman values where 5 'sand' particles are clustered. '0' values for sand indicate that sand is present throughout the gauge reading.

These data show that the carbon black products of Examples 27–33 can be used in a thermoset acrylic composition. At equal grinding times some of these products give a jetter coating then the standard.

| Example # | Grind 2 h | Grind 4 h | Grind 6 h | Grind 23 h | Grind 25 h | Grind 48 h | KU$^b$ | Gloss | L* | a* | b* |
|---|---|---|---|---|---|---|---|---|---|---|---|
| Surface Treated Standard | 4.2 | 5.5 | 6.2 | 7.2 | 7.2 | nd$^e$ | 91 | 88 | 1.68 | 0.12 | 0.38 |
| Surface Treated Standard$^a$ | 4.4 | 4.0$^c$ | — | — | — | 59 h$^d$ | 96 | 96 | 1.03 | −0.07 | −0.20 |
| Untreated Standard$^a$ | 4.8 | 5.2$^c$ | — | — | — | 7.5 59 h | 113 | 95 | 1.02 | −0.10 | −0.34 |
| 27 | 3 | 4 | 6.6 | 5 | 8+ | nd$^e$ | 98 | 88 | 1.19 | 0.06 | 0.04 |
| 28 | 5 | 6 | 7.1 | 6.5 | 8+ | nd$^e$ | 98 | 85 | 1.21 | 0.07 | 0.00 |
| 29 | 3 | 5.5 | 5.9 | 7.2 | 8+ | nd$^e$ | 98 | 90 | 1.23 | 0.00 | 0.04 |
| 30 | 3 | 4.5 | 5.4 | 8+ | —$^d$ | nd$^e$ | 100 | 88 | 1.57 | 0.00 | 0.26 |
| 31 | 2.2 | 4.8 | 6.3 | 8+ | 8+ | nd$^e$ | 92 | 91 | 1.58 | 0.09 | 0.26 |
| 32 | 3.2 | 3.8 | 3.5 | —$^d$ | —$^d$ | —$^d$ | 88 | 91 | 1.00 | −0.04 | −0.12 |
| 33 | 1 | 1.1 | 0.9 | 2 | 2 | 5.5$^f$ | 89 | 92 | 1.43 | 0.09 | 0.30 |

$^a$Separate run with the surface treated standard for 59 h, with limited sampling.
$^b$Viscosity measured in Krebs Units on a Brookfield KU-1 viscometer.
$^c$Samples taken at 3 h.
$^d$Material is too viscous to make a drawdown on the grind gauge.
$^e$Milling terminated at 25 h.
$^f$Grind gauge reading taken after first reduction.

Example 35

Use of carbon black products in coatings compositions

This example illustrates the use of carbon black products in acrylic enamel compositions. A surface treated carbon black with a surface area of 560 m²/g and a DBPA of 100 mL/100 g was used as a reference carbon black. The carbon black products of Examples 32 and 33 were subjected to Soxhlet extraction with tetrahydrofuran before use.

The grind was done on a paint shaker with a mixture of 200 g ³⁄₁₆" chrome steel balls, 2.19 g of the carbon black sample, and a grind vehicle consisting of 19.9 g of an 80/20 mixture of DMR-499 Acrylic Mixing Enamel [PPG Finishes, Strongsville, Ohio] and Xylene. Total grind time was 2 hours. Samples were evaluated on a Hegman gauge at the intervals noted below. After the grind cycle was complete, the final formulation was made by adding 23.3 g DMR-499, 17.3 g Xylene, and 1.4 g DXR-80 urethane hardener [PPG Finishes, Strongsville, Ohio] to each mill and shaking for an additional 15 min.

A 3 mil drawdown of each of these formulations was made on a sealed Leneta chart. The film was air dried for 30 min., then baked at 140° F. for 30 min. This film was used to evaluate the optical properties as presented below. Grind data correspond to Hegman values where 5 'sand' particles are clustered. '0' values for sand indicate that sand is present throughout the gauge reading.

These data indicate that the carbon black products of Examples 29, 32, and 33 may be used to produce acrylic enamel compositions with good jetness.

Grind Data

| Example\Time (min) | 20 | 30 | 40 | 50* | 60 | 70 | 90 | 120 | Final Formulation |
|---|---|---|---|---|---|---|---|---|---|
| Surface Treated Carbon Black | 0.5 | 4.5 | 5 | 6+ | 8 | 7.2 | 8 | 8 | 8 |
| 29 | 5.2 | 6 | 6.6 | 6.9 | 6.2 | 7 | 8 | 8 | 8 |
| 33 | 0.5 | 0 | 4 | 4.1 | 0.6 | 0.5 | 0.5 | 1.5 | 4.5 |
| 32 | 0 | 0 | 1 | 3.5 | 0.8 | 1.2 | 0.2 | 1.5 | 5.75 |

*Grinding paused for 18 hours, then resumed.

Optical Properties

| | Gloss @ | Hunter Color Meter | | |
|---|---|---|---|---|
| Example | 60° | L* | a* | b* |
| Untreated Standard | 92 | 0.59 | −0.07 | −0.28 |
| 29 | 95 | 0.39 | −0.08 | −0.18 |
| 33 | 88 | 0.88 | 0.07 | −0.09 |
| 32 | 73 | 1.63 | −0.01 | −0.12 |

Example 36

Preparation of $N^1$-hexanoylsulfanilamide $N^1$-hexanoylsulfanilamide was prepared as follows. To a mixture of $N^4$-acetylsulfanilamide (55.0 g) and pyridine (54 mL) at 95° C. was added hexanoyl chloride (28.8 g) over a period of 20 min. After an additional hour the reaction mixture was cooled to room temperature and the reaction was worked up by diluting with 600 mL D.I. water and acidifying with aqueous HCl. The product of this reaction, $N^4$-acetyl-$N^1$-hexanoylsulfanilamide, was isolated by filtration and washed with D.I. water (700 mL) to afford an off-white solid. This material was carried directly to the next step.

$N^4$-acetyl-$N^1$-hexanoylsulfanilamide from the previous step was treated with sodium hydroxide (24.6 g) in D.I. water (200 mL) while heating to reflux. After 3 hours reaction time, the heating was stopped and the solution pH adjusted to 8 with 2N HCl. The solution was cooled in an ice bath and then filtered to remove sulfanilamide. The filtrate was acidified with aqueous HCl to pH 2 to precipitate the product, $N^1$-hexanoylsulfanilamide, 37.9 g. This material was recrystallized from hot ethanol (75 mL) and precipitated by addition of 40 mL D.I. water to afford recrystallized $N^1$-hexanoylsulfanilamide, 24.8 g (43% overall yield). $H^1$-NMR indicated a purity >90%.

Example 37

Preparation of $N^1,N^1$-bis(2-hydroxyethyl) sulfanilamide $N^1,N^1$-bis(2-hydroxyethyl) sulfanilamide was prepared as follows. (This method was taken in part from G. DiModica and E. Angeletti, *Gazz. chim. ital.*, 1960, 90, 434–9 [CA 55:11344d].) A mixture of sodium carbonate (55.6 g), D.I. water (120 mL), and diethanolamine (57.8 g) was stirred and heated to 60°–70° C. Acetylsulfanilyl chloride (116.8 g) was added as a solid over an hour. D.I. water (225 mL) was added in portions during the acetylsulfanilyl chloride addition to keep the mixture stirrable. The mixture was stirred for an additional 3 hours at 60°–70° C., then allowed to cool to room temperature for about 16 hours. The solids were isolated by filtration and washed with 200 mL cold D.I. water.

The crude product (170 g) was hydrolyzed by treating with 5% NaOH solution (675 mL) at 60° C. for 4 hours. The aqueous solution was extracted with 3 portions of ethyl acetate (1.5 L total). The extracts were dried over anhydrous sodium sulfate, filtered and evaporated to afford the product, $N^1,N^1$-bis(2-hydroxyethyl)sulfanilamide, as an off-white solid, 72.1 g (55.5% crude yield).

Example 38

Preparation of a Carbon Black Product

This example reflects an alternative method that does not require the use of added acid. Acetylsulfanilamide (10 g) was dissolved in 500 mL D.I. water at 90° C. To this solution was added a carbon black with a surface area of 58 $m^2/g$ and DBPA of 46 mL/100 g (100 g). After the carbon black was incorporated into the mixture, sodium nitrite (3.24 g) in D.I. water (10 mL) was added to the slurry. Gas was immediately evolved. Heating was suspended and the mixture stirred and allowed to cool to ambient temperature. The carbon black slurry was evaporated to dryness at 65° C. The product had attached p-$C_6H_4SO_2NHCOCH_3$ groups.

Example 39

Preparation of a Carbon Black Product

Sulfabenzamide (26.0 g), 23.5 mL concentrated HCl, 25 mL acetone, and 100 mL D.I. water were combined and stirred. A carbon black with a surface area of 58 $m^2/g$ and DBPA of 46 mL/100 g (100 g) was suspended in 500 mL D.I. water and the stirred slurry was cooled in an ice water bath. Sodium nitrite (6.50 g), was dissolved in about 25 mL D.I. water and this solution was added over several minutes to the sulfabenzamide solution.

After 10–20 minutes, the diazonium salt solution was split into two equal portions. One portion was added to the slurry of carbon black in water. Gas evolution was immediately evident. Stirring was continued until no further gas evolution was observed. The product was isolated by filtration and washing with D.I. water. The product was dried at 75° C. for 16 hours. The product had attached p-$C_6H_4SO_2NHCOC_6H_5$ groups.

Example 40

Preparation of a Carbon Black Product in the presence of ammonium hydroxide

A carbon black with a surface area of 58 $m^2/g$ and DBPA of 46 mL/100 g (100 g) was suspended in a mixture of 9.8 mL concentrated ammonium hydroxide and 500 mL D.I. water and stirred. The remaining portion of the diazonium solution from example 39 was added to the slurry of carbon black in water. Gas evolution was immediately evident. Stirring was continued until no further gas evolution was observed. The product was isolated by filtration and washing with D.I. water, then dried at 75° C. for 16 hours. The product had attached p-$C_6H_4SO_2NHCOC_6H_5$ groups.

Example 41

Preparation of a Carbon Black Product $N^1$-Hexanoylsulfanilamide (12.7 g) from example 36, 11.8 mL concentrated HCl, 40 mL acetone, and 200 mL D.I. water were combined. The solution was cooled in an ice water bath. A carbon black with a surface area of 58 $m^2$/g and DBPA of 46 mL/100 g (50 g) was suspended in 200 mL D.I. water and the stirred slurry was cooled in an ice water bath. Sodium nitrite (3.24 g), was dissolved in about 20 mL D.I. water and this solution was added over several minutes to the $N^1$-hexanoylsulfanilamide solution.

After 10–20 minutes at 0°–10° C., the diazonium salt solution was split into two equal portions. One portion was added to the slurry of carbon black in water. Gas evolution was immediately evident. The slurry was removed from the ice bath and stirring was continued until no further gas evolution was observed. The product was isolated by filtration and washing with several portions of D.I. water. The damp solid was dried at 75° C. The product had attached p-$C_6H_4SO_2NHCOC_5H_{11}$ groups.

Example 42

Preparation of a Carbon Black Product in the presence of ammonium hydroxide

A carbon black with a surface area of 58 $m^2$/g and DBPA of 46 mL/100 g (50 g) was suspended in a mixture of 4.9 mL concentrated ammonium hydroxide and 200 mL D.I. water and the stirred slurry was cooled in an ice water bath. The remaining portion of the diazonium solution from example 41 was added to the slurry of carbon black in water. Gas evolution was immediately evident. The slurry was removed from the ice bath and stirring was continued until no further gas evolution was observed. The product was isolated by filtration and washing with several portions of D.I. water. The damp solid was dried at 75° C. The product had attached p-$C_6H_4SO_2NHCOC_5H_{11}$ groups.

Example 43

Preparation of a Carbon Black Product $N^1,N^1$-bis(2-hydroxyethyl)sulfanilamide (66.3 g) from example 37, 66.8 mL concentrated HCl, and 350 mL D.I. water were combined. The solution was cooled in an ice water bath. A carbon black with a CTAB surface area of 350 $m^2$/g and DBPA of 120 mL/100 g (150 g) was suspended in 1,500 mL D.I. water and the stirred slurry was cooled in an ice water bath. Sodium nitrite (17.6 g), was dissolved in about 60 mL D.I. water and this solution was added over several minutes to the $N^1,N^1$-bis(2-hydroxyethyl) sulfanilamide solution. After 10–20 minutes at 0°–10° C., the diazonium salt solution was added in one portion to the slurry of carbon black in water. Gas evolution was immediately evident. The slurry was removed from the ice bath and stirring was continued until no further gas evolution was observed. The product was isolated by filtration and washing with several portions of D.I. water. The damp solid was dried at 60° C. The product had attached p-$C_6H_4SO_2N(C_2H_4OH)_2$ groups.

Example 44

Preparation of a Carbon Black Product

Sulfabenzamide (93.9 g) was dissolved in a solution of 340 mL of 1N sodium hydroxide and 1,700 mL D.I. water. To this solution was added a carbon black with a CTAB surface area of 350 $m^2$/g and DBPA of 120 mL/100 g (200 g). After 15 min., 85 mL concentrated HCl were slowly added to the suspension. Sodium nitrite (23.5 g), was dissolved in about 75 mL D.I. water and this solution was added over several minutes to sulfabenzamide solution. Gas evolution was immediately evident. The slurry was removed from the ice bath and stirring was continued until no further gas evolution was observed. The product was isolated by filtration and washing with several portions of D.I. water. The damp solid was dried at 60° C. The product had attached p-$C_6H_4SO_2NHCOC_6H_5$ groups.

Example 45

Three Roll Mill grind results for Examples 39–42

The carbon black products of Examples 39–42 were evaluated for rate of incorporation and optical properties according to the methods described in Example 24. The data in the tables below show that the products of Examples 39–42 can be used to produce an ink. The products of Examples 41 and 42 demonstrated enhanced incorporation in the grind vehicle.

| Sample\Pass# | Fineness of Grind Data | | | | | |
|---|---|---|---|---|---|---|
| | 1 | 2 | 3 | 4 | 5 | 6 |
| Untreated Standard | 50 | 37 | 21 | 19 | —a | |
| Example 39 | 50 | 48 | 32 | 30 | 30 | 29 |
| Example 40 | 50 | 46 | 30 | 22 | 20 | 22 |
| Example 41 | 32 | 23 | 20 | 20 | —a | |
| Example 42 | 20 | 22 | 20 | 18 | —a | | aGrinding stopped after four mill passes.

Optical properties for inks made from the carbon black products of Examples 39–42 and an untreated standard were determined from prints made using an RNA-52 printability tester (Research North America Inc.) and are shown in the table below. Values for 1.0 and 2.0 micron film thickness were calculated from linear regression of the data from the prints having a range of film thicknesses.

| Optical Properties of Prints from Examples 39–42 | | | | | | |
|---|---|---|---|---|---|---|
| SAMPLE TREATMENT | Film Thickness (microns) | Optical Density | L* | a* | b* | Gloss @ 60° |
| Untreated Standard | 1.0 | 1.32 | 25.35 | 1.34 | 3.57 | 39.88 |
| Untreated Standard | 2.0 | 2.13 | 5.28 | 0.70 | 0.37 | 51.85 |
| Example 39 | 1.0 | 1.15 | 30.91 | 1.60 | 4.88 | 34.98 |
| Example 39 | 2.0 | 1.85 | 10.59 | 1.28 | 2.59 | 47.52 |
| Example 40 | 1.0 | 1.27 | 27.63 | 1.41 | 3.90 | 39.77 |
| Example 40 | 2.0 | 2.06 | 6.18 | 1.05 | 1.32 | 51.81 |
| Example 41 | 1.0 | 1.31 | 25.30 | 1.55 | 4.28 | 37.92 |
| Example 41 | 2.0 | 2.01 | 8.02 | 0.91 | 1.17 | 45.43 |
| Example 42 | 1.0 | 1.27 | 26.71 | 1.43 | 3.98 | 37.50 |
| Example 42 | 2.0 | 2.06 | 6.32 | 0.86 | 0.84 | 49.92 |

Example 46

Use of carbon black products in coatings compositions

The carbon black products from Examples 43 and 44 were used in the thermoset acrylic formulation as described in Example 34. The optical properties of these coatings resulting from ball milling for 96 hours are summarized below.

These data show that the carbon black products of Examples 43 and 44 can be used in a thermoset acrylic composition.

| Example # | L* | a* | b* | Optical Density [a] | Gloss at 60° | Viscosity KU[b] |
|---|---|---|---|---|---|---|
| 43 | 1.33 | −0.01 | −0.12 | 2.75 | 89.4 | 121 |
| 44 | 1.78 | −0.01 | −0.13 | 2.66 | 91.7 | 111 |

[a] Optical desities measured with a MacBeth RD918 densitometer.
[b] Viscosity measured in Krebs Units on a Brookfield KU-1 viscometer.

The claimed invention is:

1. A non-aqueous coating composition comprising a non-aqueous solvent and a modified carbon product comprising carbon having attached a substituted or unsubstituted aromatic group.

2. The composition of claim 1 wherein the aromatic ring of the aromatic group is an aryl group.

3. The composition of claim 1 wherein the aromatic ring of the aromatic group is a heteroaryl group.

4. The composition of claim 1 wherein the aromatic group is a group of the formula $A_y Ar$—, in which Ar is an aromatic radical selected from the group consisting of phenyl, naphthyl, anthracenyl, phenanthrenyl, biphenyl, pyridinyl and triazinyl;

A is hydrogen, a functional group selected from the group consisting of R, OR, COR, COOR, OCOR, halogen, CN, $NR_2$, $SO_2NR_2$, $SO_2NR(COR)$, $NR(COR)$, $CONR_2$, $NO_2$, and N=NR'; or A is a linear, branched or cyclic hydrocarbon radical, unsubstituted or substituted with one or more of said functional groups;

R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_x R''$ or a substituted or unsubstituted aryl;

R' is hydrogen, a $C_1$–$C_{20}$ substituted or unsubstituted alkyl, or a substituted or unsubstituted aryl;

R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl or a substituted or unsubstituted aroyl; x is from 1–40; and y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl, or 1 to 2 when Ar is triazinyl.

5. The composition of claim 1 wherein the aromatic group has a) an aromatic group and b) at least one group of the formula $SO_2NR_2$ or $SO_2NR(COR)$ wherein R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_x R'$, or a substituted or unsubstituted aryl; R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl, a substituted or unsubstituted aroyl; and x is 1 to 40.

6. The composition of claim 5 wherein the aromatic group is p-$C_6H_4SO_2NH_2$.

7. The composition of claim 5 wherein the aromatic group is p-$C_6H_4SO_2NHC_6H_{13}$.

8. The composition of claim 5 wherein the aromatic group is p-$C_6H_4SO_2NHCOCH_3$.

9. The composition of claim 5, wherein the aromatic group is p-$C_6H_4SO_2NHCOC_5H_{11}$.

10. The composition of claim 1, wherein the carbon is carbon black, graphite, vitreous carbon, finely-divided carbon, activated charcoal, activated carbon, or mixtures thereof.

11. The composition of claim 10, wherein the carbon is carbon black.

12. A non-aqueous ink composition comprising a non-aqueous solvent and a modified carbon product comprising carbon having attached a substituted or unsubstituted aromatic group.

13. A composition of claim 12 wherein the aromatic ring of the aromatic group is an aryl group.

14. A composition of claim 12 wherein the aromatic ring of the aromatic group is a heteroaryl group.

15. The composition of claim 12 wherein the aromatic group is a group of the formula $A_y Ar$—, in which Ar is an aromatic radical selected from the group consisting of phenyl, naphthyl, anthracenyl, phenanthrenyl, biphenyl, pyridinyl and triazinyl;

A is hydrogen, a functional group selected from the group consisting of R, OR, COR, COOR, OCOR, halogen, CN, $NR_2$, $SO_2NR_2$, $SO_2NR(COR)$, $NR(COR)$, $CONR_2$, $NO_2$, and N=NR'; or A is a linear, branched or cyclic hydrocarbon radical, unsubstituted or substituted with one or more of said functional groups;

R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_x R''$ or a substituted or unsubstituted aryl;

R' is hydrogen, a $C_1$–$C_{20}$ substituted or unsubstituted alkyl, or a substituted or unsubstituted aryl;

R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl, or a substituted or unsubstituted aroyl; x is from 1–40; and y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl, or 1 to 2 when Ar is triazinyl.

16. A composition of claim 12 wherein the aromatic group has a) an aromatic group and b) at least one group of the formula $SO_2NR_2$ or $SO_2NR(COR)$ wherein R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_x R'$, or a substituted or unsubstituted aryl; R' is hydrogen, a $C_1$–$C_{20}$ substituted or unsubstituted alkyl, a $C_3$–$C_{20}$ substituted or unsubstituted alkenyl, $C_1$–$C_{20}$ substituted or unsubstituted alkanoyl or substituted or unsubstituted aroyl; and x is 1 to 40.

17. The composition of claim 15 wherein the aromatic group is p-$C_6H_4SO_2NH_2$.

18. The composition of claim 15 wherein the aromatic group is p-$C_6H_4SO_2NHC_6H_{13}$.

19. A composition of claim 15 wherein the organic group is p-$C_6H_4SO_2NHCOCH_3$.

20. The composition of claim 15, wherein the organic group is p-$C_6H_4SO_2NHCOC_5H_{11}$.

21. The composition of claim 12, wherein the carbon is carbon black, graphite, vitreous carbon, finely-divided carbon, activated charcoal, activated carbon, or mixtures thereof.

22. The composition of claim 21, wherein the carbon is carbon black.

23. A modified carbon product comprising a carbon having an attached organic group having a) an aromatic group and b) at least one group of the formula $SO_2NR_2$ or $SO_2NR(COR)$ wherein R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_x R'$ or a substituted or unsubstituted aryl; R' is hydrogen, a $C_1$–$C_{20}$ substituted or unsubstituted alkyl, a $C_3$–$C_{20}$ substituted or unsubstituted alkenyl, $C_1$–$C_{20}$ substituted or unsubstituted alkanoyl or substituted or unsubstituted aroyl; and x is from 1 to 40.

24. The modified carbon product of claim 23, wherein the carbon is carbon black, graphite, vitreous carbon, finely-divided carbon, activated charcoal, activated carbon, or mixtures thereof.

25. The modified carbon product of claim 24, wherein the carbon is carbon black.

26. The modified carbon product of claim 25, wherein the aromatic group is p-$C_6H_4SO_2NH_2$.

27. The modified carbon product of claim 25, wherein the aromatic group is p-$C_6H_4SO_2NHC_6H_{13}$.

28. The modified carbon product of claim 25, wherein the aromatic group is p-$C_6H_4SO_2NHCOCH_3$.

29. The modified carbon product of claim 25, wherein the aromatic group is p-$C_6H_4SO_2NHCOC_5H_{11}$.

30. A method for improving optical properties of a non-aqueous coating composition, comprising the step of:
incorporating into the non-aqueous coating composition a modified carbon product comprising carbon having attached a substituted or unsubstituted aromatic group.

31. The method of claim 30, wherein the aromatic group is a group of the formula $A_yAr$—, in which
Ar is an aromatic radical selected from the group consisting of phenyl, naphthyl, anthracenyl, phenanthrenyl, biphenyl, pyridinyl and triazinyl;
A is hydrogen, a functional group selected from the group consisting of R, OR, COR, COOR, OCOR, halogen, CN, $NR_2$, $SO_2NR_2$, $SO_2NR(COR)$, $NR(COR)$, $CONR_2$, $NO_2$, and N=NR'; or A is a linear, branched or cyclic hydrocarbon radical, unsubstituted or substituted with one or more of said functional groups;
R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_xR"$ or a substituted or unsubstituted aryl;
R' is hydrogen, a $C_1$–$C_{20}$ substituted or unsubstituted alkyl, or a substituted or unsubstituted aryl;
R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl or a substituted or unsubstituted aroyl; x is from 1–40; and
y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl, or 1 to 2 when Ar is triazinyl.

32. The method of claim 30 wherein the aromatic group has a) an aromatic group and b) at least one group of the formula $SO_2NR_2$ or $SO_2NR(COR)$ wherein R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_xR'$, or a substituted or unsubstituted aryl; R' is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl, or a substituted or unsubstituted aroyl; and x is 1 to 40.

33. The method of claim 30, wherein the carbon is carbon black, graphite, vitreous carbon, finely-divided carbon, activated charcoal, activated carbon, or mixtures thereof.

34. The method of claim 33, wherein the carbon is carbon black.

35. A method for improving optical properties of a non-aqueous ink composition, comprising the step of:
incorporating into the non-aqueous ink composition a modified carbon product comprising carbon having attached a substituted or unsubstituted aromatic group.

36. The method of claim 35 wherein the aromatic group is a group of the formula $A_yAr$—, in which
Ar is an aromatic radical selected from the group consisting of phenyl, naphthyl, anthracenyl, phenanthrenyl, biphenyl, pyridinyl and triazinyl;
A is hydrogen, a functional group selected from the group consisting of R, OR, COR, COOR, OCOR, halogen, CN, $NR_2$, $SO_2NR_2$, $SO_2NR(COR)$, $NR(COR)$, $CONR_2$, $NO_2$, and N=NR'; or A is a linear, branched or cyclic hydrocarbon radical, unsubstituted or substituted with one or more of said functional groups;
R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_xR"$ or a substituted or unsubstituted aryl;
R' is hydrogen, a $C_1$–$C_{20}$ substituted or unsubstituted alkyl, or a substituted or unsubstituted aryl;
R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl, or a substituted or unsubstituted aroyl; x is from 1–40; and
y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl, or 1 to 2 when Ar is triazinyl.

37. The method of claim 35 wherein the aromatic group has a) an aromatic group and b) at least one group of the formula $SO_2NR_2$ or $SO_2NR(COR)$ wherein R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_xR'$, or a substituted or unsubstituted aryl; R' is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl, or a substituted or unsubstituted aroyl; and x is 1 to 40.

38. The method of claim 35, wherein the carbon is carbon black, graphite, vitreous carbon, finely-divided carbon, activated charcoal, activated carbon, or mixtures thereof.

39. The method of claim 38, wherein the carbon is carbon black.

40. The non-aqueous coating composition of claim 1, further comprising a coloring pigment other than carbon black.

41. The non-aqueous coating composition of claim 2, further comprising a coloring pigment other than carbon black.

42. The non-aqueous coating composition of claim 3, further comprising a coloring pigment other than carbon black.

43. The non-aqueous coating composition of claim 4, further comprising a coloring pigment other than carbon black.

44. The non-aqueous coating composition of claim 5, further comprising a coloring pigment other than carbon black.

45. The non-aqueous coating composition of claim 10, further comprising a coloring pigment other than carbon black.

46. The non-aqueous coating composition of claim 11, further comprising a coloring pigment other than carbon black.

47. The non-aqueous coating composition of claim 1, wherein the aromatic group is directly attached to the carbon.

48. The non-aqueous coating composition of claim 5, wherein the aromatic group is directly attached to the carbon.

49. The non-aqueous ink composition of claim 12, wherein the aromatic group is directly attached to the carbon.

50. The non-aqueous ink composition of claim 16, wherein the aromatic group is directly attached to the carbon.

51. The modified carbon product of claim 23, wherein the aromatic group is directly attached to the carbon.

52. The method of claim 30, wherein the aromatic group is directly attached to the carbon.

53. The method of claim 32, wherein the aromatic group is directly attached to the carbon.

54. The method of claim 35, wherein the aromatic group is directly attached to the carbon.

55. The method of claim 37, wherein the aromatic group is directly attached to the carbon.

* * * * *